(12) United States Patent
Jaffrey

(10) Patent No.: US 9,879,526 B2
(45) Date of Patent: Jan. 30, 2018

(54) SUBSEA ELECTRONIC DATA SYSTEM

(71) Applicant: Cameron International Corporation, Houston, TX (US)

(72) Inventor: Andrew Jaffrey, Oldmeldrum (GB)

(73) Assignee: Cameron Internation Corporation, Houston, TX (US)

( * ) Notice: Subject to any disclaimer, the term of this patent is extended or adjusted under 35 U.S.C. 154(b) by 1 day.

(21) Appl. No.: 14/835,915

(22) Filed: Aug. 26, 2015

(65) Prior Publication Data
US 2015/0361786 A1    Dec. 17, 2015

Related U.S. Application Data

(62) Division of application No. 13/596,759, filed on Aug. 28, 2012.

(51) Int. Cl.
*E21B 47/12* (2012.01)
*E21B 33/06* (2006.01)
*E21B 33/035* (2006.01)
*E21B 33/03* (2006.01)

(52) U.S. Cl.
CPC .......... *E21B 47/12* (2013.01); *E21B 33/0355* (2013.01); *E21B 33/062* (2013.01)

(58) Field of Classification Search
CPC ..... E21B 33/062; E21B 33/0355; E21B 47/12
USPC .................................................. 340/850, 851
See application file for complete search history.

(56) References Cited

U.S. PATENT DOCUMENTS

| 7,216,714 | B2 | 5/2007 | Reynolds | |
|---|---|---|---|---|
| 7,328,741 | B2* | 2/2008 | Allen | E21B 44/00 166/335 |
| 7,921,917 | B2 | 4/2011 | Kotrla et al. | |
| 8,511,388 | B2* | 8/2013 | Milne | E21B 33/0355 166/363 |
| 8,511,389 | B2* | 8/2013 | Fenton | E21B 33/0385 166/250.01 |

(Continued)

FOREIGN PATENT DOCUMENTS

| EP | 2383429 | 11/2011 |
|---|---|---|
| GB | 2477034 | 7/2011 |

(Continued)

OTHER PUBLICATIONS

International Search Report and Written Opinion of PCT Application No. PCT/US2013/056811 dated Nov. 18, 2013: pp. 1-10.

*Primary Examiner* — Omar CasillasHernandez
(74) *Attorney, Agent, or Firm* — Chamberlain Hrdlicka

(57) ABSTRACT

A subsea electronic information system for managing data related to a characteristic of subsea equipment locatable subsea. The system includes sensors locatable subsea and in communication with and capable of measuring a characteristic of the subsea equipment. A sensor interface box (SIB) separate from the sensors and locatable subsea includes a processor and a memory device capable of receiving and storing sensor measurement data. Additionally, the SIB is in data and power communication with the sensors.

The system further includes a subsea retrievable data capsule capable of recording all system data over a long period. The capsule may be recovered from subsea (independently of the other elements of the information system) for forensic analysis of the recorded data.

17 Claims, 4 Drawing Sheets

(56) References Cited

U.S. PATENT DOCUMENTS

| | | | |
|---|---|---|---|
| 2004/0015618 A1* | 1/2004 | Risi | H04L 12/40 710/15 |
| 2004/0262008 A1* | 12/2004 | Deans | E21B 41/0007 166/339 |
| 2007/0107904 A1 | 5/2007 | Donahue et al. | |
| 2009/0194290 A1 | 8/2009 | Parks et al. | |
| 2009/0265395 A1 | 10/2009 | Milne | |
| 2009/0288836 A1* | 11/2009 | Goodall | F16L 1/26 166/336 |
| 2010/0011853 A1* | 1/2010 | Anthony | E21B 47/011 73/152.02 |
| 2010/0171637 A1 | 7/2010 | Jaffrey et al. | |
| 2011/0100710 A1 | 5/2011 | Fossli | |
| 2011/0177779 A1 | 7/2011 | Rhodes et al. | |
| 2011/0266003 A1 | 11/2011 | Singh et al. | |
| 2011/0304218 A1 | 12/2011 | Hyland et al. | |
| 2011/0308795 A1 | 12/2011 | Hyland et al. | |
| 2011/0308796 A1 | 12/2011 | Hyland et al. | |
| 2012/0000646 A1 | 1/2012 | Liotta et al. | |
| 2012/0098674 A1 | 4/2012 | McStay et al. | |
| 2012/0132430 A1 | 5/2012 | Ebenezer | |
| 2012/0197527 A1 | 8/2012 | McKay et al. | |
| 2013/0058192 A1* | 3/2013 | Gateman | G01V 1/201 367/20 |
| 2013/0083627 A1* | 4/2013 | Yates | E21B 47/18 367/83 |
| 2013/0103208 A1* | 4/2013 | Niemeyer | E21B 34/045 700/282 |
| 2013/0341094 A1* | 12/2013 | Taherian | E21B 47/14 175/40 |
| 2014/0064029 A1 | 3/2014 | Jaffrey | |
| 2014/0311735 A1 | 10/2014 | Landrith, II et al. | |
| 2015/0159459 A1 | 6/2015 | Liotta et al. | |

FOREIGN PATENT DOCUMENTS

| | | |
|---|---|---|
| GB | 2478761 | 9/2011 |
| GB | 2481303 | 12/2011 |
| GB | 2481304 | 12/2011 |
| GB | 2481305 | 12/2011 |
| WO | 2011114152 | 9/2011 |

* cited by examiner

SUBSEA ELECTRONIC DATA SYSTEM

BACKGROUND

In most offshore drilling operations, a wellhead at the sea floor is positioned at the upper end of the subterranean wellbore lined with casing, a blowout preventer (BOP) stack is mounted to the wellhead, and a lower marine riser package (LMRP) is mounted to the BOP stack. The upper end of the LMRP typically includes a flex joint coupled to the lower end of a drilling riser that extends upward to a drilling vessel at the sea surface. A drill string is hung from the drilling vessel through the drilling riser, the LMRP, the BOP stack, and the wellhead into the wellbore.

During drilling operations, drilling fluid, or mud, is pumped from the sea surface down the drill string, and returns up the annulus around the drill string. There are a number of functions and operating parameters of the LMRP, BOP, and other subsea well equipment that may need to be monitored and controlled.

As an example, in the event of a rapid invasion of formation fluid into the annulus, commonly known as a "kick," the BOP stack and/or LMRP may actuate to help seal the annulus and control the fluid pressure in the wellbore. In particular, the BOP stack and the LMRP include closure members, or cavities, designed to help seal the wellbore and prevent the release of high-pressure formation fluids from the wellbore. Thus, the BOP stack and LMRP function as pressure control devices.

For most subsea drilling operations, hydraulic fluid for operating the BOP stack and the LMRP is provided using a common control system physically located on the surface drilling vessel. However, the common control system may become inoperable, resulting in a loss of the ability to operate the BOP stack. As a backup, or even possibly a primary means of operation, hydraulic fluid accumulators are filled with hydraulic fluid under pressure. The amount and size of the accumulators depends on the anticipated operation specifications for the well equipment.

An example of an accumulator includes a piston accumulator, which includes a hydraulic fluid section and a gas section separated by a piston moveable within the accumulator. The hydraulic fluid is placed into a fluid section of the accumulator and pressurized by injecting gas (typically Nitrogen) into the gas section. The fluid section is connected to a hydraulic circuit so that the hydraulic fluid may be used to operate the well equipment. As the fluid is discharged, the piston moves within the accumulator under pressure from the gas to maintain pressure on the remaining hydraulic fluid until full discharge.

The ability of the accumulator to operate a piece of equipment depends on the amount of hydraulic fluid in the accumulator and the pressure of the fluid. Thus, there may be a need to know the volume of the hydraulic fluid remaining in an accumulator so that control of the well equipment may be managed. Measuring the volume of hydraulic fluid in the accumulator over time can also help identify if there is a leak in the accumulator or hydraulic circuit.

BRIEF DESCRIPTION OF THE DRAWINGS

For a detailed description of the preferred embodiments of the invention, reference will now be made to the accompanying drawings in which.

DETAILED DESCRIPTION

Figure 1:
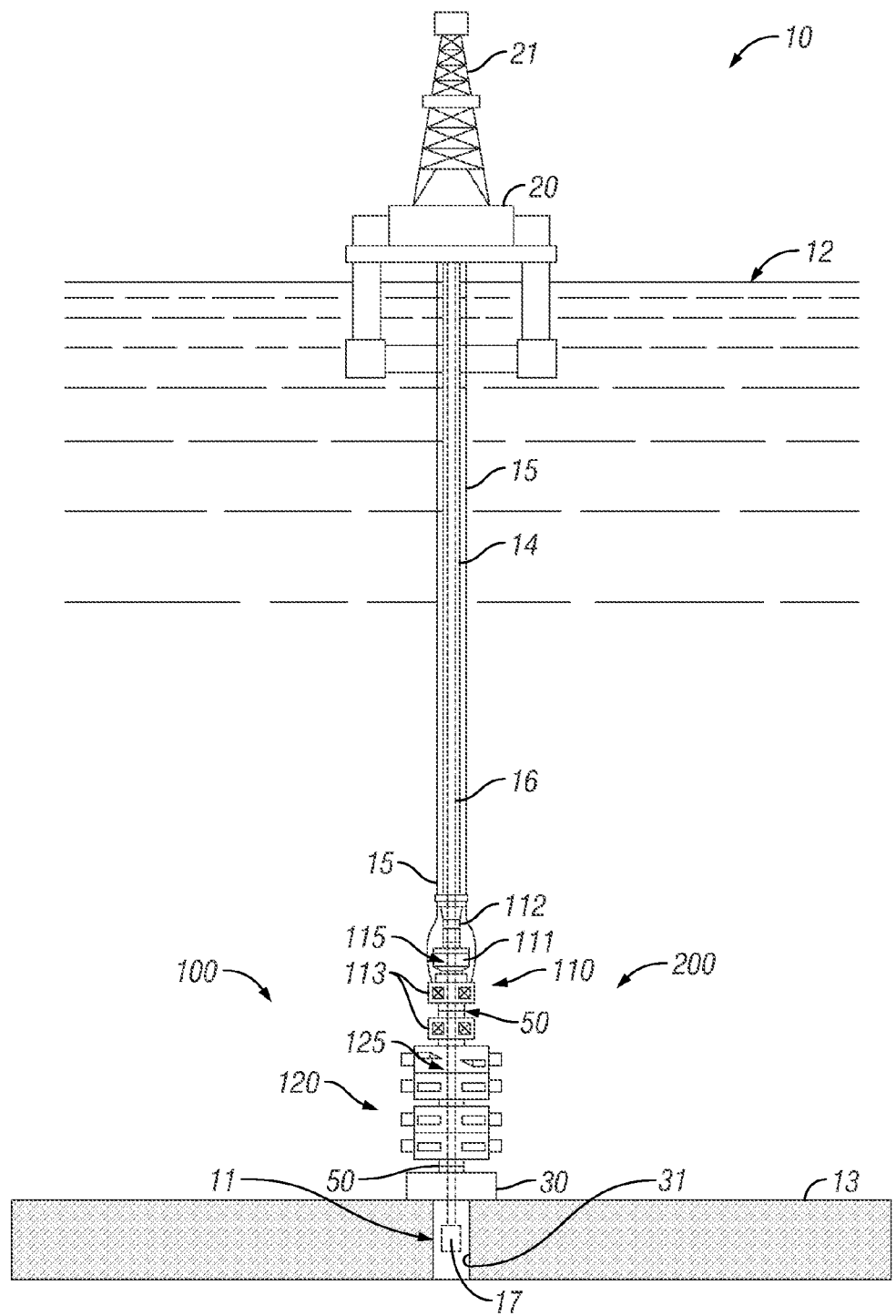
FIG. 1 shows a schematic view of an offshore system for drilling and/or producing a subterranean wellbore with an embodiment of an electronic data collection and control system.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIG. 1, an embodiment of an offshore system 10 for drilling and/or producing a wellbore 11 is shown. In this embodiment, the system 10 includes an offshore vessel or platform 20 at the sea surface 12 and a subsea BOP stack assembly 100 mounted to a wellhead 30 at the sea floor 13. The platform 20 is equipped with a derrick 21 that supports a hoist (not shown). A tubular drilling riser 14 extends from the platform 20 to the BOP stack assembly 100. The riser 14 returns drilling fluid or mud to the platform 20 during drilling operations. One or more hydraulic conduit(s) 15 extend along the outside of the riser 14 from the platform 20 to the BOP stack assembly 100. The conduit(s) 15 supply pressurized hydraulic fluid to the assembly 100. Casing 31 extends from the wellhead 30 into the subterranean wellbore 11.

Downhole operations are carried out by a tubular string 16 (e.g., drillstring, production tubing string, coiled tubing, etc.) supported by the derrick 21 and extending from the platform 20 through the riser 14, through the BOP stack assembly 100, and into the wellbore 11. A downhole tool 17 is connected to the lower end of the tubular string 16. In general, the downhole tool 17 may comprise any suitable downhole tool(s) for drilling, completing, evaluating, and/or producing the wellbore 11 including, without limitation, drill bits, packers, cementing tools, casing or tubing running tools, testing equipment, perforating guns, and the like. During downhole operations, the string 16, and hence the tool 17 coupled thereto, may move axially, radially, and/or rotationally relative to the riser 14 and the BOP stack assembly 100.

Figure 2:
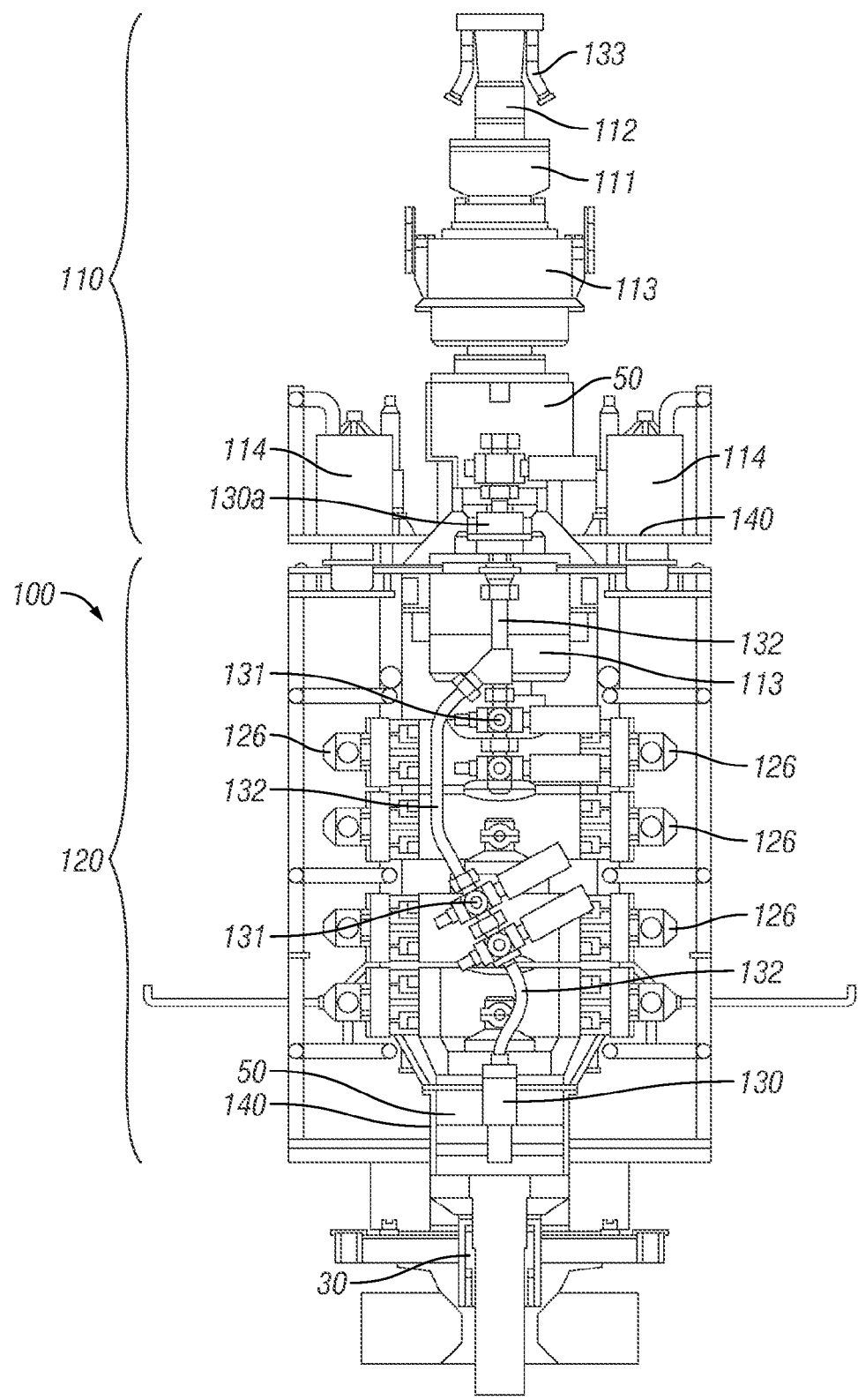
FIG. 2 shows an elevation view of the subsea BOP stack assembly and electronic data collection and control system of FIG. 1.
Figure 3:
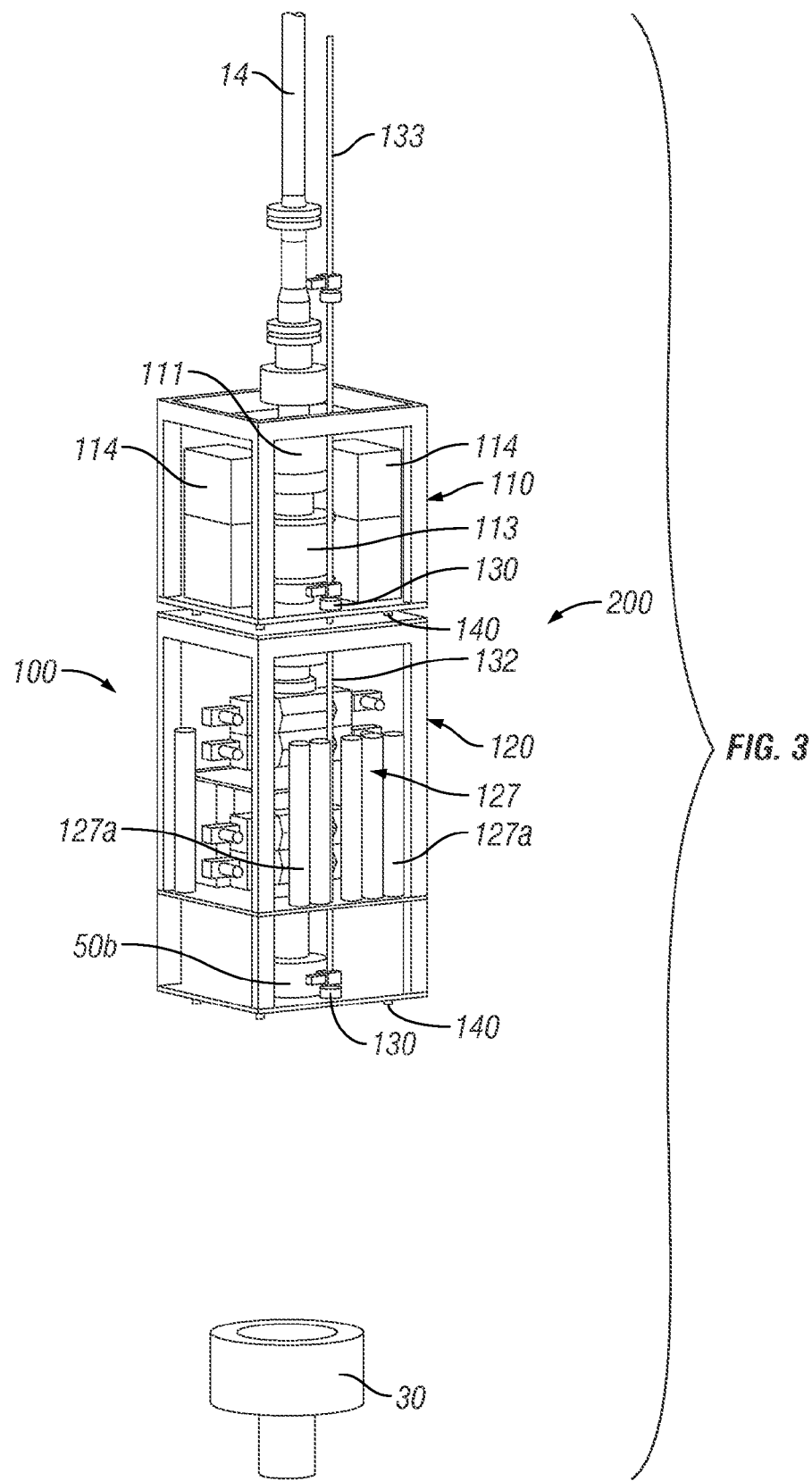
FIG. 3 shows a perspective view of the subsea BOP stack assembly and electronic data collection and control system of FIGS. 1 and 2.

Referring now to FIGS. 1-3, the BOP stack assembly 100 is mounted to the wellhead 30 and is designed and configured to control and seal the wellbore 11, thereby containing the hydrocarbon fluids (liquids and gases) therein. In this embodiment, the BOP stack assembly 100 comprises a lower marine riser package (LMRP) 110 and a BOP or BOP stack 120.

The BOP stack 120 is releasably secured to the wellhead 30 as well as the LMRP 110. Likewise, the LMRP 110 is releasably secured to the BOP stack 120 and the riser 14. In this embodiment, the connections between the wellhead 30, the BOP stack 120, and the LMRP 110 include hydraulically actuated, mechanical wellhead-type connections 50. In general, the connections 50 may comprise any suitable releasable wellhead-type mechanical connection such as the DWHC or HC profile subsea wellhead system available from Cameron International Corporation of Houston, Tex., or any other such wellhead profile available from several subsea wellhead manufacturers. Typically, such hydraulically actuated, mechanical wellhead-type connections (e.g., the connections 50) include an upward-facing male connector, or "hub," that is received by and releasably engages a downward-facing mating female connector or receptacle 50b. In this embodiment, the connection between LMRP 110 and the riser 14 is a flange connection that is remotely controlled, just as the connections 50 may be remotely, hydraulically controlled.

Referring to FIGS. 1-4, the LMRP 110 includes a riser flex joint 111, a riser adapter 112, one or more annular BOPs 113, and a pair of redundant control units or pods 114. A flow bore 115 extends through the LMRP 110 from the riser 14 at the upper end of the LMRP 110 to the connection 50 at the lower end of the LMRP 110. The riser adapter 112 extends upward from the flex joint 111 and is coupled to the lower end of the riser 14. The flex joint 111 allows the riser adapter 112 and the riser 14 connected thereto to deflect angularly relative to the LMRP 110 while wellbore fluids flow from the wellbore 11 through the BOP stack assembly 100 into the riser 14. The annular BOP 113 comprises an annular elastomeric sealing element that is mechanically squeezed radially inward to seal on a tubular extending through the LMRP 110 (e.g., the string 16, casing, drillpipe, drill collar, etc.) or seal off the flow bore 115. Thus, the annular BOP 113 has the ability to seal on a variety of pipe sizes and/or profiles.

In this embodiment, the BOP stack 120 comprises at least one annular BOP 113 as previously described, choke/kill valves 131, and choke/kill lines 132. Choke/kill line connections 130 connect the female choke/kill connectors of the LMRP 110 with the male choke/kill adapters of the BOP stack 120, thereby placing the choke/kill connectors of the LMRP 110 in fluid communication with the choke lines 132 of the BOP stack 120. A main bore 125 extends through the BOP stack 120. In addition, the BOP stack 120 includes a plurality of axially stacked ram BOPs 121. Each ram BOP 121 includes a pair of opposed rams and a pair of actuators 126 that actuate and drive the matching rams. In this embodiment, the BOP stack 120 includes four ram BOPs 121—an upper ram BOP 121 including opposed blind shear rams or blades for severing the tubular string 16 and sealing off the wellbore 11 from the riser 14 and the three lower ram BOPs 121 including the opposed pipe rams for engaging the string 16 and sealing the annulus around the tubular string 16. In other embodiments, the BOP stack (e.g., the stack 120) may include a different number of rams, different types of rams, one or more annular BOPs, or combinations thereof. The control pods 114 include subsea electronics modules (SEMs) and operate the valves 131, the ram BOPs, and the annular BOPs 113 of the LMRP 110 and the BOP stack 120.

As best shown in FIG. 3, the BOP stack 120 also includes at least one set or bank 127 of hydraulic accumulators 127a mounted on the BOP stack 120. While the primary hydraulic pressure supply is provided by the hydraulic conduits 15 extending along the riser 14, the accumulator bank(s) 127 may also be used to support operation of the rams, the choke/kill valves 131, the connector 50b of the BOP stack 120, and the choke/kill connectors 130 of the BOP stack 120. As will be explained in more detail below, the accumulator bank(s) 127 serves as a backup means to provide hydraulic power to operate the rams, the valves 131, the connector 50b, and the connectors 130 of the BOP stack 120.

Although the control pods 114 may be used to operate the BOPs 121 and the choke/kill valves 131 of the BOP stack 120 in this embodiment, in other embodiments, the BOPs 121 and the choke/kill valves 131 may also be operated by one or more subsea remotely operated vehicles (ROVs).

As previously described, in this embodiment, the BOP stack 120 includes one annular BOP 113 and four sets of rams (one set of shear rams and three sets of pipe rams). However, in other embodiments, the BOP stack 120 may include different numbers of rams, different types of rams, different numbers of annular BOPs (e.g., annular BOP 113), or combinations thereof. Further, although the LMRP 110 is shown and described as including one annular BOP 113, in other embodiments, the LMRP (e.g., LMRP 110) may include a different number of annular BOPs (e.g., two sets of annular BOPs 113). Further, although the BOP stack 120 may be referred to as a "stack" since it contains a plurality of ram BOPs 121 in this embodiment, in other embodiments, BOP 120 may include only one ram BOP 121.

Both the LMRP 110 and the BOP stack 120 comprise re-entry and alignment systems 140 that allow the LMRP 110-BOP stack 120 connections to be made subsea with all the auxiliary connections (i.e., control units, choke/kill lines) aligned. The choke/kill line connectors 130 interconnect the choke/kill lines 132 and the choke/kill valves 131 on the BOP stack 120 to the choke/kill lines 133 on the riser adapter 112. Thus, in this embodiment, the choke/kill valves 131 of the BOP stack 120 are in fluid communication with the choke/kill lines 133 on the riser adapter 112 via the connectors 130. However, the alignment systems 140 are not always necessary and need not be included.

Figure 4:
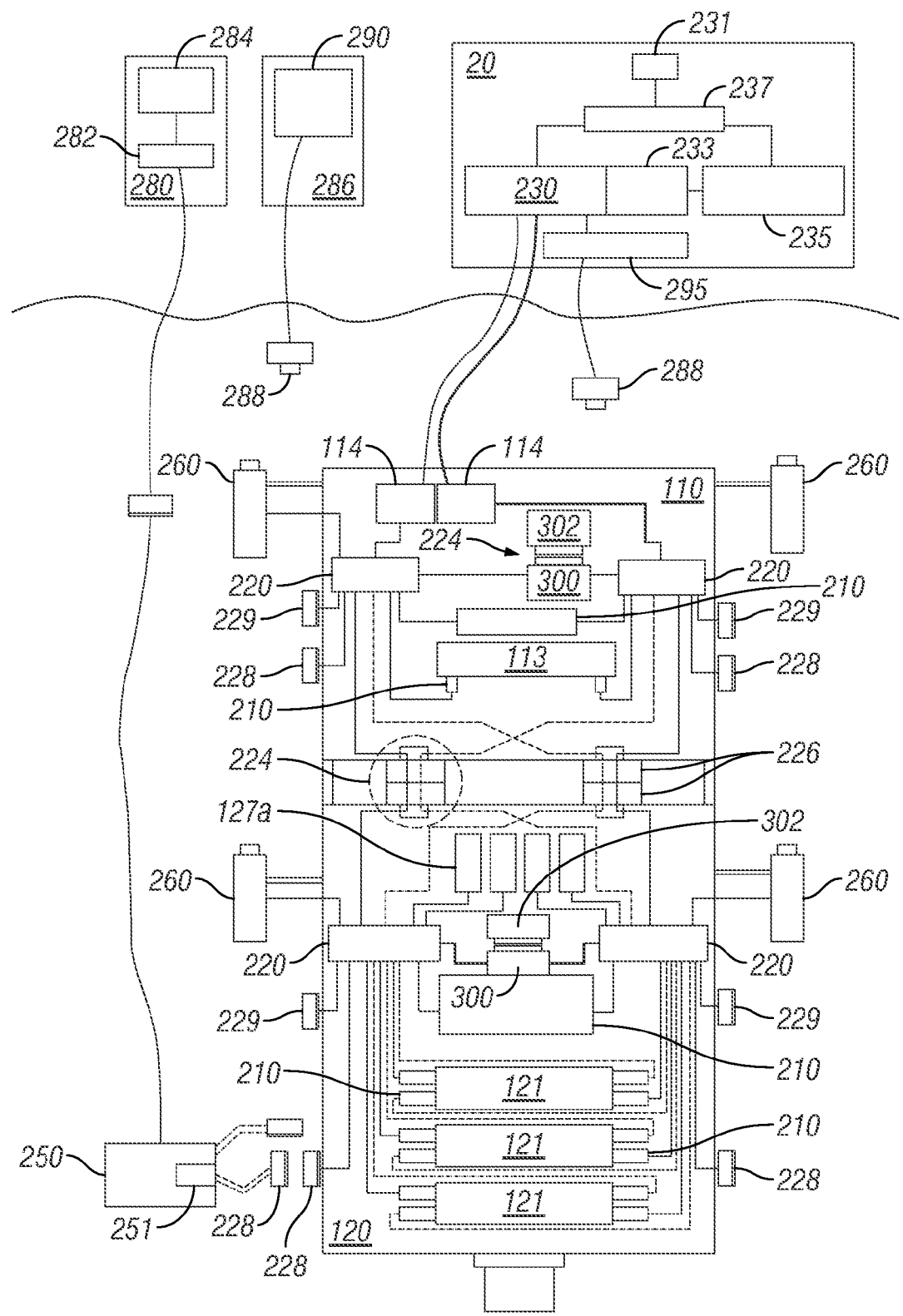
FIG. 4 is a schematic view of the electronic data collection and control system, including the information system.

As shown in FIGS. 3 and 4, the subsea BOP stack assembly 100 further includes a subsea electronic data system, which includes at least one sensor 210. In this embodiment, the sensors 210 measure operating conditions of various equipment on the BOP stack 120 or other subsea well equipment such as the LMRP 110. For example, the sensors 210 may measure the position of movable pistons within the hydraulic accumulators 127a that separate hydraulic fluid from gas. There may be a sensor 210 for each accumulator 127a or there may be a sensor 210 (or sensors) that measures the position of more than one piston. In this manner, there may be fewer sensors 210 than accumulators 127a, with the potential for as little as one sensor 210 for the entire data system. As shown schematically in FIG. 4, the sensors 210 may be located at various positions on the LMRP 110 and the BOP stack 120. In addition to measuring position, the data system may also include sensor(s) 210 for measuring temperature within the internal volume of the accumulators 127a, for example. Sensors 210 may also be used to measure the position of the rams in the BOPs 113, 121. Sensors 210 may also be used to measure other conditions, such as pressure, flow rates, temperature, BOP lock status, connection status, etc., of the equipment on the LMRP 110 or the BOP stack 120.

As shown in more detail in FIG. 4, the electronic data system further includes at least one sensor interface box (SIB) 220 capable of receiving the measurement information from the sensor(s) 210. In this embodiment, the data system includes more than one SIB 220 networked together. However, the SIBs 220 may also be separate from each other. The SIBs 220 collect and store and/or retransmit the information from sensors 210 on the BOP stack 120 and the LMRP 110. If the SIBs 220 are used as local data historians for the sensors 210 to store sensor data, the SIBs 220 may include a suitable memory device, such as a flash memory hard drive for example. The SIBs 220 may also include equipment to provide power supply management and power conditioning, including secondary elements of wireless data and power (WDP) units described further below. The SIBs 220 may also include the subsea elements of a data over power system as described more fully below. The SIBs 220 include processors and electronic components capable of handling data manipulation, such as real-time reporting, reporting on demand, or reporting by exception, for example. The SIBs 220 also include electronic components for various communication protocols as described further below. Additionally, the SIBs 220 may house control cards for the sensors 210 when the control cards are not integral to the sensors 210 themselves. The SIBs 220 also include any required networking/addressing components and capability based on the design of the system.

Data and power communication between the SIBs 220 on the BOP stack 120 and the SIBs 220 on the LMRP 110 may be accomplished by using wireless data and power (WDP) units 224 made up of receiver plates 226 when the LMRP 110 is in proximity to the BOP stack 120. The WDP receiver plates 226, or wireless stingers, are located on each of the BOP stack 120 and the LMRP 110. When located sufficiently close to each other, wireless data and power communication may be established between the BOP stack 120 and the LMRP 110. Data may be transferred wirelessly using any suitable protocol, such as Ethernet running Modbus TCP, RS232 and RS485. Also, power may be communicated by inductive methods.

The data system is designed for efficiency, modularity, and multiple redundancy for accessing data. As a measure of redundancy, more than one SIB 220 may be used as shown in FIG. 4. Each SIB 220 is dedicated to receive information from only some of the sensors 210. Which SIB 220 a sensor 210 communicates with may be designed specifically as a redundancy feature in case communication with one of the SIBs 220 becomes unavailable. For example, sensors measuring the ram position of the BOPs 121 may send data to one SIB 220 while sensors measuring the lock status of the same BOPs 121 may be sent to another SIB 220. However, each of the SIBs 220 is networked together as shown by the solid and dotted line connections between the SIBs 220. In this manner, every SIB 220 can record all of the data from all of the sensors 210 even though different sensors 210 may be connected with different SIBs 220. Additionally, communication with all of the SIBs 220 may be established by establishing communication with only one SIB 220. Additionally, historical data stored in one SIB 220 may be accessed by another SIB 220.

The SIBs 220 may also retransmit the sensor information through any one or more transmission paths. One possible transmission path is using the riser 14 (FIG. 3) to communicate information to the sea surface. In this configuration, the SIBs 220 communicate through the riser 14 to a communication center 230 on the sea surface. The communication center 230 may be connected to a human/machine interface (HMI) 231 such as a computer display and various controls as well as a data historian 237 for recording the data.

Communication using the riser 14 may also be established with any other suitable data connection or connections between the SIBs 220 and the communication center 230, such as using other existing power and data communication connections. For example, as shown the LMRP 110 includes control pods 114 with subsea electronics modules (SEMs) that communicate through a wired connection with the communication center 230 using typical so-called "yellow" and "blue" umbilicals.

Power for the data system instrumentation and electronics may be provided by a power unit 233 on the rig 20 that communicates with the system via umbilicals connected with the LMRP 110. Power from the power unit 233 is transferred from the LMRP 110 to the BOP stack 120 instrumentation and electronics through the WDP receiver plate 226 connections between the LMRP 110 and the BOP stack 120. The power unit 233 may also work in conjunction with a data over power surface unit 235 to provide data communication capability with the subsea elements of the data over the power system. The data over power surface unit 235 includes processors and electronic components for encoding and decoding communications protocols as well as any required networking/addressing components and capability based on the design of the system.

The data received by either the communication center 230 or the data over power surface unit 235 may be recorded and stored in a suitable memory device 237, or historian, such as a flash memory hard drive for example. The memory device 237 is the primary information repository for the control system HMI 231 and provides data to be displayed on the HMI 231.

Another transmission path may be through the use of a remotely operated vehicle (ROV) 250. For ROV access, the data system may include at least one WDP receiver plate 228 at a location on the BOP stack 120 and/or LMRP 110 accessible by the ROV. The data system may also include multiple WDP receiver plates 228, located in multiple places on each of the LMRP 110 and the BOP stack 120 for added accessibility and redundancy. To establish communication with the sea surface, the ROV 250 equipped with a counterpart WDP plate 228 is maneuvered into proximity with the WDP plate 228 on the LMRP 110 or the BOP stack 120. Alternatively, other communication interfaces such as ROV stabs 229 or wet-mate connectors may be provided to establish direct communication between the SIBs 220 and the ROV 250. Using either the WDP or ROV stab connection to establish a communication link, information may be transmitted from the SIBs 220 to an ROV support vessel (ROVSV) 280 at the sea surface through the transmission line of the ROV 250. The ROVSV 280 may include an ROV interface 282 and another human/machine interface (HMI) 284 for displaying the transmitted data as well as inputting commands. The HMI 284 may optionally be connected with a portable acoustic unit for use of a common display. It should be appreciated that the ROV communication equipment may be provided instead of or in conjunction with the riser or umbilical communication equipment described above.

Another possible communication path is for the SIBs 220 to communicate with a vessel of opportunity (VoO) 286 through acoustic telemetry. Optionally included on the LMRP 110 and/or the BOP stack 120 are acoustic communication and power units 260 that communicate with an acoustic transducer 288 connected with a portable surface acoustic unit 290 located on the VoO 286. The portable surface acoustic unit 290 is an autonomous, self-supporting unit that is battery powered and capable of controlling and receiving data from the acoustic transducer 288. The information sent or received using the acoustic communication and power units 260 may be processed in a similar manner as described above. Additionally, the acoustic communication and power units 260 may be used to provide power to the subsea equipment of the data system as and when required. It should be appreciated that the portable acoustic communication equipment may be used by itself with or without the LMRP and/or ROV communication equipment described above.

In conjunction with or alternative to the portable surface acoustic unit 290, the data system may also include a fixed surface acoustic unit 295 installed on the rig 20 and connected with its own acoustic transducer 288. The fixed surface acoustic unit 295 is powered by electrical power from the rig 20 and the acoustic transducer 288 may either be a dunking transducer or a fixed hull transceiver. The fixed surface acoustic unit 295 is capable of communicating with the subsea acoustic communication and power units 260 to both receive information from the SIBs 220 as well as send operator instructions. The fixed surface acoustic unit 295 may also interface directly with the surface HMI 231 to display received information as well as input of commands to be sent to the SIBs 220. It should be appreciated that the fixed acoustic communication equipment may be used by itself with or without the other communication equipment described above.

Through one or more of these different communication paths, the SIBs 220 may receive various inputs, including data from the sensors 210 and interrogation requests from the HMIs 231, 290, and 284 as well as other communications from the sea surface via umbilicals from the surface, the WDP units of the system, or through the acoustic communication and power units 260. The SIBs 220 may also receive power and communications via the various WDP units of the system. The SIBs 220 may also receive data from other SIBs 220, potentially as part of a communication path to the surface equipment. The SIBs 220 may also receive power via the acoustic communication and power units 260, the control pods 114, the ROV WDP units 228, or from the ROV stab or wet-mate connector 229.

The SIBs 220 may also produce certain outputs, including power to the sensors 210 and pass-through of command/control signals from the surface equipment (e.g., HMI 231) such as interrogation requests for example. The SIBs 220 may also produce processed data from the sensors 210 as live or historical values. The processed data may include reporting by exception, in which case the exception conditions may be flexible, e.g., above or below a value, in or out of a range, percentage change, and rate of change, and all of these conditions may be configurable by an operator via the surface HMIs 231, 290, and 284. The SIBs 220 may also output all processed sensor data going to the surface from the data system.

The LMRP SIBs 220 also receive various inputs, including interrogation requests from the HMIs 231, 290, and 284 from the sea surface and data from the sensors 210 on the LMRP 110. The SIBs 220 may also include power via the data over power unit 233, ROV WDP units 228, ROV stab or wet-mate connector 229, or via the acoustic communication and power units 260. The SIBs 220 may also produce certain outputs, including processed data from the sensors 210 on the LMRP 110. The processed data may include reporting by exception, in which case the exception conditions may be flexible, e.g., above or below a value, in or out of a range, percentage change, and rate of change, and all of these conditions may be configurable by an operator via the surface HMIs 231, 290, and 284.

As an example of the data gathering functionality of the data system, a sensor 210 may be located to measure the position of the piston of the ram of a BOP 121. The sensor 210 sends a signal to a control board mounted in an SIB 220 located on the BOP stack 120. The SIB 220 also provides power to the sensor 210 as well as handles electrical power management for other sensors 210 on the BOP stack 120. The SIB 220 includes a local data historian so that in the event that the communications that pass through the LMRP 110 are unavailable, the sensor data will be available either through the acoustic unit(s) 260 connected to the SIB 220 or via the ROV connection(s) 228, 229 to the SIB 220.

Assuming that the LMRP 110 is in position and connected to the BOP stack 120, the ram position sensor data passes from the SIB 220 on the BOP stack 120 through a WDP unit 224 to a SIB 220 on the LMRP 110. Each SIB 220 on the LMRP 110 also includes a local data historian so that in the event that the communications that pass through the main umbilicals are unavailable, the sensor data will be available via either the acoustic unit(s) 260 connected to the SIB 220 on the LMRP 110 or via the ROV connection(s) 228, 229 to the SIB 220 on the LMRP 110.

The SIB 220 on the LMRP 110 includes the subsea elements of the data over power sub-system and the sensor data are then communicated to the lines that connect the LMRP's control pods 114. From the control pods 114, the data passes up the power conductors in the blue and yellow umbilicals to the surface. The surface data over power unit extracts and processes the sensor data from the power line and, using network protocols, makes the information available to the surface data historian 237. The ram position sensor data are then accessed by the data historian 237 and displayed on the HMI 231.

Other sensor data are handled in a similar manner, depending on whether the sensor is on the LMRP 110 or the BOP stack 120. Regardless of where the sensor is mounted, however, there are multiple routes available to retrieve the data using at least one of four different technologies: (1) direct connection; (2) acoustic; (3) wireless ROV coupling; and (4) wet-mate ROV coupling.

As shown in FIG. 4, the subsea electronic data system may also include one or more retrievable data capsules (RDCs) 302, which operate as so-called "black-box" data recorders to log all LMRP 110 and BOP stack 120 data. By taking advantage of the communications network and by utilizing available interfaces on the SEMs (within the control pods 114) the data captured and held subsea can be expanded from just the sensor data to include all the communications passing up and down the main control umbilicals discussed above. This information typically includes, but is not limited to: single valve, regulate, and multiple valve commands received (from the operator on the surface), commands acknowledged (the SEM confirming receipt of a given single valve, regulate, or multiple valve command), valve states (open or closed?) and analogue values such as pressures and temperatures. By placing one or more RDCs 302 subsea, the data system offers unprecedented levels of redundancy and potential access to critical data due to the networked nature of the system providing the opportunity to add the RDCs 302.

Preferably, two RDCs are used: one RDC 302 on the LRMP 110 and one RDC 302 on the BOP stack 120. The RDCs 302 may be mounted on the LMRP 110 and the BOP stack 120 in locations that are considered to be readily ROV accessible and connected to the data network using, preferably, the same WDP units 224 as previously discussed. The WDP units 224 establish communication between the RDC 302 and a network junction unit 300 for establishing communication with the data system network. In the case of the RDC 302, however, the whole unit will be detachable for retrieval to the surface for data download and analysis. To this end, the RDCs 302 may be packaged in ROV retrievable housings to allow recovery from subsea to surface for data download and analysis.

Given that the RDCs 302 are regarded as a black box data recorder, reliability and robustness are important. Preferably, the RDC 302 internal components and functions will be of an equivalent standard to the data storage used in aircraft flight data recorders. The RDC 302 units may include control electronics for the RDC's WDP unit internal to the housing. The RDCs 302 may also include a combined data storage, processing, and networking unit internal to the housing. However, these functions may be split out in separate units as well. Additionally, a dry-mate external connector may be included for downloading data from the RDC 302 after retrieval from subsea.

The RDCs 302 may also include interfaces to the data system Ethernet network for access to the SIB 220 and SEM data. The RDCs may also include interfaces to data download and analysis equipment (on a surface vessel or elsewhere). The RDCs 302 may also accept all data logged by SIBs 220, i.e., sensors connected directly to the network. The RDCs 302 may also accept all communications traffic passing through main control umbilicals, i.e., commands sent from the surface, plus all information sent topside from subsea, via SEMs. Power for the RDCs 302 may be provided from the data network, i.e., from the umbilicals, ROV connections, or acoustic units as described above.

Normally, while in-situ on LMRP 110 or BOP stack 120, the RDCs 302 will not have any outputs. When recovered to the surface for interrogation, the RDCs 302 may output all available logged data.

The ability to log all communications traffic through the main umbilicals requires data storage. As an example only, the system may require the capacity to store more than 8 GB of data. The data may be stored on any suitable data storage means, such as a flash drive. One means of maximizing data logging without an undue overhead of large storage is by using the reporting on exception strategies. Although intended primarily for use in the event that the only communication channel available is acoustic and, therefore, low bandwidth, reporting on exception strategies would also allow much larger volumes of information to be stored in a given memory capacity than when all data are recorded. Preferably, the RDCs will support data logging of multiple preceding days of operation. Once the data recording capacity is full, the RDCs 302 may follow a rolling logging/deleting process such that the latest data are always recorded and the oldest data deleted.

In recording data, the RDCs 302 may also log the data entries with time stamps in a manner that accurately correlates with all other entries. In this manner, the timestamp for an event such as an operator pressing a command button is synchronized with the timestamp of the log entries of the receipt and acknowledgement of that action subsea.

To ensure accurate and consistent time synchronisation between all the RDCs 302, a network time protocol (NTP) server and associated techniques may be used. The timing derived from the NTP server will ensure that the timestamp applied to all data logged in the system's historians (including the RDCs 302) is done in a consistent, accurate, and controlled manner. Where a reference signal, such as a GPS input, is available on the rig 20, the NTP servers may also be equipped to connect to this signal.

Although the present invention has been described with respect to specific details, it is not intended that such details should be regarded as limitations on the scope of the invention, except to the extent that they are included in the accompanying claims.

What is claimed is:

1. A subsea electronic information system for managing data related to a characteristic of subsea equipment locatable subsea, the system including:
  sensors locatable subsea and in communication with and configured to measure a characteristic of the subsea equipment;
  a sensor interface box (SIB) separate from the sensors and locatable subsea, the SIB including a processor and a memory device configured to receive and store sensor measurement data, the SIB configured to control, receive data from, and provide power to the sensors; and
  a wireless data and power (WDP) assembly comprising a wireless receiver configured to wirelessly communicate power and data from the SIB with another SIB and store the data from the other SIB in the memory device of the SIB.

2. The system of claim 1, further including more than one SIB networked together for data communication to form a network, each SIB connected with at least one sensor in data and power communication.

3. The system of claim 2, wherein an SIB is capable of accessing data from sensors connected with another SIB.

4. The system of claim 2, wherein the SIBs are networked together for power and data communication through the WDP assembly.

5. The system of claim 2, wherein the SIBs are in bi-directional communication with surface equipment.

6. The system of claim 5, wherein the SIBs are capable of executing commands from the surface equipment relating to communicating sensor data.

7. The system of claim 1, further including:
an SIB communication interface configured to be in communication with an underwater remotely-operated vehicle (ROV) so as to be able to communicate data from the SIB; and
the ROV including an ROV communication interface configured to communicate the data and power with the SIB through the SIB communication interface.

8. The system of claim 7, further including more than one SIB communication interface.

9. The system of claim 7, wherein the SIB communication interface and the ROV communication interface include wireless data and power (WDP) interfaces.

10. The system of claim 7, wherein the SIB communication interface and the ROV communication interface include a stab and receiver receptacle.

11. The system of claim 7, wherein the SIB communication interface and the ROV communication interface include a wet-mate connector.

12. The system of claim 7, further including an ROV support vehicle (ROVSV) connected with the ROV.

13. The system of claim 2, further including a subsea acoustic communication and power unit locatable subsea in communication with at least one SIB.

14. The system of claim 13, further including:
a vessel of opportunity (VoO) at the sea surface, the VoO including a portable acoustic unit and a surface acoustic transducer; and
wherein the surface acoustic transducer and the subsea acoustic communication and power unit are configured to bi-directionally wirelessly communicate information between an SIB and the portable acoustic unit.

15. The system of claim 13, further including:
a communication center located at the sea surface;
a surface acoustic transducer in communication with the communication center; and
wherein the surface acoustic transducer and the subsea acoustic communication and power unit are capable of bi-directionally wirelessly communicating information between an SIB and the communication center.

16. The system of claim 2, further including a data over power connection between a communication center at the sea surface and at least one SIB.

17. The system of claim 2, further including a retrievable data capsule removably connected with the SIBs for data communication, the retrievable data capsule including a storage device for storing all data communicated on the network.

* * * * *